(12) United States Patent
Ahmed et al.

(10) Patent No.: US 6,939,073 B1
(45) Date of Patent: Sep. 6, 2005

(54) RELEASABLE LOCKING MECHANISMS

(75) Inventors: Rafiq Ahmed, Madison, AL (US); Robert J. Wingate, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 81 days.

(21) Appl. No.: 10/652,083

(22) Filed: Aug. 26, 2003

(51) Int. Cl.[7] ............................. F16D 1/00; F16B 1/00
(52) U.S. Cl. ............................. 403/24; 403/2; 403/21; 411/433
(58) Field of Search .................... 403/2, 11, 12, 21, 403/343, DIG. 3, 24, DIG. 4; 411/432–434, 411/20; 294/82.26, 82.32, 82.3; 244/158 R, 244/161, 137.4, 173

(56) References Cited

U.S. PATENT DOCUMENTS

| | | | |
|---|---|---|---|
| 2,745,303 A * | 5/1956 | Cornelius .................... 269/218 |
| 4,410,293 A * | 10/1983 | Elias et al. .................... 403/24 |
| 4,669,354 A | 6/1987 | Lucy |
| 4,682,804 A * | 7/1987 | Palmer et al. ............ 294/82.26 |
| 5,002,418 A * | 3/1991 | McCown et al. ............. 403/24 |
| 5,123,794 A | 6/1992 | Pire |
| 5,160,233 A | 11/1992 | McKinnis |
| 5,248,233 A | 9/1993 | Webster |
| 5,603,595 A * | 2/1997 | Nygren, Jr. ................ 411/14.5 |
| 5,651,296 A | 7/1997 | Halm et al. |
| 5,671,650 A | 9/1997 | Aubret |
| 5,771,742 A * | 6/1998 | Bokaie et al. .................... 74/2 |
| 6,095,736 A | 8/2000 | Miller et al. |
| 6,119,984 A * | 9/2000 | Devine .................... 244/158 R |
| 6,202,961 B1 | 3/2001 | Wilke et al. |
| 6,311,930 B1 * | 11/2001 | Hersh et al. ............ 244/158 R |
| 6,352,397 B1 | 3/2002 | O'Quinn et al. |
| 6,406,074 B1 | 6/2002 | Mahaney |
| 2002/0164204 A1 | 11/2002 | Kaszubowski et al. |
| 2004/0156669 A1 * | 8/2004 | Lejeune .......................... 403/2 |

* cited by examiner

OTHER PUBLICATIONS

Johnston, A.S., Ahmed, R., Garrison, J.C., Gaines, J.L., Waggoner, J.D., "X-38 Bolt Retrctor Subsystems Separation Demonstration," NASA Technical Memorandum 2002-212047, NASA Center for AeroSpace Information (MSFC, Alabama), (Sep. 3, 2002).

Primary Examiner—Robert J. Sandy
Assistant Examiner—Ruth C. Rodriguez
(74) Attorney, Agent, or Firm—James J. McGroary; Norman L. Wilson, Jr.

(57) ABSTRACT

In the aerospace field spacecraft components are held together by separation systems until a specific time when they must be separated or deployed. Customarily a threaded joining bolt engages one of the components to be joined, and a threaded nut is placed on that bolt against the other component so they can be drawn together by a releasable locking assembly. The releasable locking assembly herein includes a plunger having one end coupled to one end of a plunger bolt. The other end is flanged to abut and compress a coil spring when the plunger is advanced toward the interface plane between the two components. When the plunger is so advanced toward the interface plane, the end of the plunger bolt can be connected to the joining bolt. Thus during retraction the joining bolt is drawn to one side of the interface plane by the force of the expanding spring.

4 Claims, 2 Drawing Sheets

RELEASABLE LOCKING MECHANISMS

STATEMENT REGARDING FEDERALLY-SPONSORED RESEARCH OR DEVELOPMENT

The invention described in this patent was made by an employee of the United States Government and may be manufactured and used by or for the Government for governmental purposes without the payment of any royalties.

CROSS-REFERENCES TO RELATED APPLICATIONS

There are no applications related to this application.

FIELD OF THE INVENTION

Separation systems are widely used in many fields, especially in the aerospace field wherein spacecraft components are held together by a releasable locking assembly until a specific time when they must be separated or deployed. Customarily a headed, threaded bolt engages one of the objects to be joined, and a threaded nut is placed on that bolt against the other object. The nut is threaded into the bolt and tightened. This invention relates generally to such separation systems.

BACKGROUND OF THE INVENTION

Separation systems commonly used in aerospace engineering and in other applications include releasable locking assemblies when interconnected mutually adjacent structures must subsequently be quickly and reliably disconnected. Examples of such structures are spacecraft and satellite launch vehicles, external fuel tanks, sensor booms, solar arrays, antennas, scientific equipment, and the like, which are used in the space program.

During the early days in the aerospace field, reliability of separation was the primary objective. If the fastener/separator failed to release on command, an entire project could be imperiled. However as use of the releasable locking assemblies increased so did the research effort. As a result of this widespread usage and research the reliability problems were solved.

Reliability is still a primary concern, but the problem per se having been solved, attention has been directed to improving separation devices. Much of the patent art is directed to these improvements. The separation devices have been developed in a variety of structures actuated to be separated by pneumatic, hydraulic or pyrotechnic forces generally resulting in mechanical shock. Bolts and nuts that can be cut or segmented to split on command by the actuated device are also the subject of patented improvements, examples being such patents as U.S. Pat. No. 6,406,074, U.S. Pat. No. 6,352,397, U.S. Pat. No. 5,671,650, U.S. Pat. No. 5,651,296, U.S. Pat. No. 5,248,233, U.S. Pat. No. 5,160,233, and U.S. Pat. No. 5,123,794.

Despite these improvements separation devices are still subject to certain limitations and disadvantages. One disadvantage is that pyrotechnic fasteners induce high stresses. Yet in order to drive pistons, or to fracture nuts or bolts, large shock loads must be produced by the explosive charge. Even the explosive force applied to segmented separation nuts can generate shock loads impacting on the assembly housing. As a load is applied to the bolt or nut, radial forces are generated which propel the segments so that they impact other components in the structures or in the separation device. This impact gives rise to particles or metal fragments having high kinetic energy that can lead to short circuits, mechanism jamming, damage to waveguides, and the like. To this end various improvements can now be found in the patent art for the reduction of release shock.

Another disadvantage has been brought to light by a NASA development. In the late 1990s NASA conceived the X-38 lifting body, along with a deorbit propulsion stage as a prototype for a full-sized crew return vehicle in the event of a catastrophic emergency that could require immediate evacuation from the Space Station. Desirably, each of the six joining bolts joining the lifting body to the deorbit propulsion stage should have a retraction time in the millisecond range. However rapid release in the case of separation mechanisms has not been as easily achievable as was imagined. Separation devices do not appear to lend themselves to improvements in the speed at which their two joined structures can be separated. Thus far it appears to have been achieved by limiting the lengths of the rods being retracted as suggested in U.S. Pat. No. 5,123,794. There is, then, room for improvement in this area as well. This invention is directed to such an improvement.

SUMMARY OF THE INVENTION

A releasable locking assembly is the subject of this invention. It is adapted for rapidly separating structures bolted together by a joining bolt and a frangible nut. The locking assembly includes a bolt retractor mechanism adapted to be secured against the structure carrying the head of the joining bolt. The separation nut is attached the bolt end protruding on the other side of the interface plane between the structures. Incorporated in the bolt retractor mechanism are a cylindrical plunger chamber, a coil spring, a plunger, a plunger bolt, and coupling means for attaching the plunger bolt to the joining bolt. The outside surface of the coil spring fits slidably along the inside surface within the cylindrical plunger chamber. The outside surface of the plunger fits slidably within the coil spring. The plunger is provided with an insertion end coupled to one end of the plunger bolt, and with an enlarged end or flange which abuts and compresses the coil spring when the plunger is advanced toward the interface plane between the two structures. When the plunger is so advanced toward the interface plane, the end of the plunger bolt away from the plunger can be connected to the joining bolt. The joining bolt is thus so disposed that during retraction it is drawn to one side of the interface plane by the force of the expanding spring without the bolt snagging on the spring. The frangible nut parts remain on the other side of the interface plane.

BRIEF DESCRIPTION OF THE DRAWINGS

Springs have been used in assemblies for connecting and separating objects such as microsatellites but they have been included for attenuation of the downward movement of the bolt as in U.S. Pat. No. 5,671,650, or to provide for initial separation of a spacecraft from a launch vehicle as in U.S. 2002/0164204 A1. The use of the coil spring herein will best be understood by referring to the accompanying drawings.

DESCRIPTION OF A PREFERRED EMBODIMENT

Heretofore springs have been used in separation systems but only to assist at the interface in forcing the two structures apart. It has now been found that the use of a coil spring within a releasable locking mechanism forming a part of a separation system leads to a more rapid motion of the joining bolt across the interface than those relying solely on energy derived from releasing the joining bolt preload. This will be appreciated, as the description of the bolt retractor mechanism is unveiled.

Figure 1:
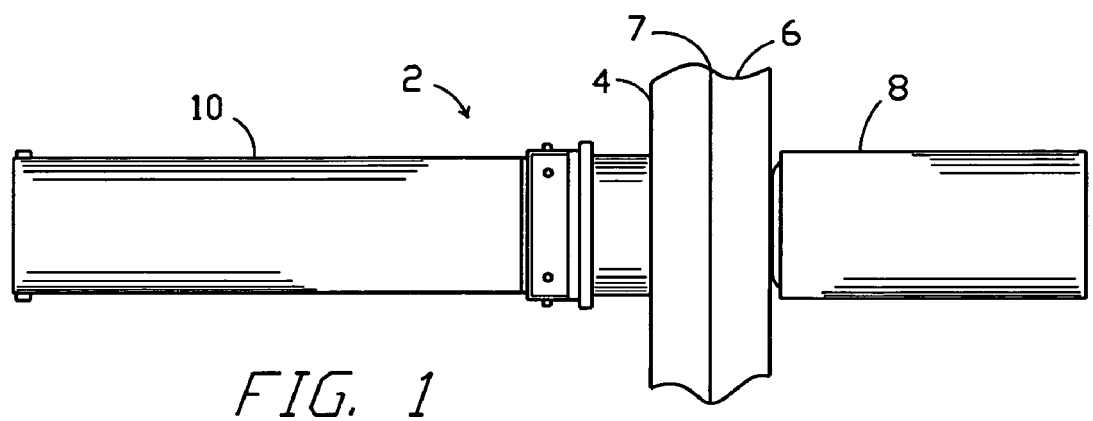
FIG. 1 is a longitudinal view showing the external appearance of the bolt retractor mechanism in its commercial embodiment.

Referring first to FIG. 1, the bolt retractor mechanism 2 is shown in its completed or commercialized form. In FIG. 1 portions of two structures 4 and 6 such as the X-38 lifting body and the deorbit propulsion stage can be seen, along with interface plane 7 there between. Also shown in FIG. 1 are the casing or shroud 8 for a frangible nut 9 (FIG. 2), to be described more fully, and a cylindrical plunger chamber 10.

Figure 2:
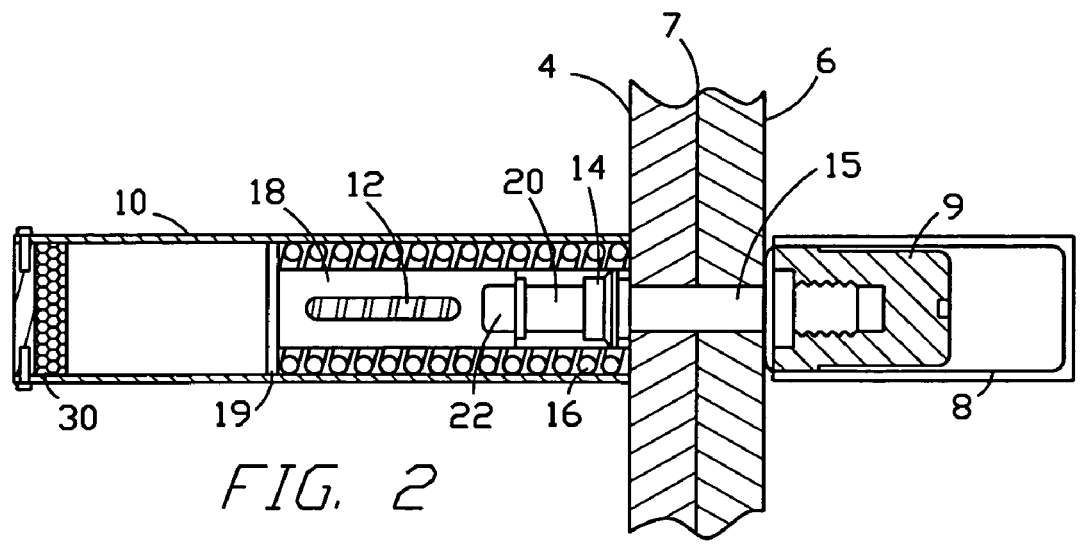
FIG. 2 is a longitudinal cross sectional view showing the bolt retractor mechanism engaged for bolt retraction.

Turning now to FIG. 2, which is a longitudinal sectional view, not only are the portions of structures 4 and 6 visible, but the interior components of the bolt retractor mechanism. The head 14 of joining bolt 15 can be seen on one side of interface plane 7 (adjacent structure portion 4) whereas frangible nut 9 is on the other side of interface plane 7 (adjacent portion 6). Nut casing or shroud 8 is in the form of a cylindrical cap to prevent the segments, parts or pieces 11 resulting from the splitting or fracturing of frangible nut 9 from flying off and damaging other system components. Structure 6 is provided with keeper, retainer, or node, such as a stud (well known in the art and hence not visible), to hold shroud or cap 8 in place. In addition cap 8 is fabricated of sufficiently strong materials so that it does not break under the impact of the exploded frangible nut.

Joining bolt 15, and frangible nut 9 make it possible to join the two structures 4 and 6 one to the other with precise preload. Frangible nuts, as well as means for breaking them away from their joining bolts, are available commercially, and hence need not be discussed at length herein. Examples are the various multipart separation nuts, such as internally threaded segmented nuts detonated by explosive, gas generating charges, and nuts having a plurality of segments assembled in a retaining ring. In our preferred embodiment for the X-38 project it is desired to avoid extreme mechanical shock. Since explosive release mechanisms have such drawbacks as high energy shock waves and inadvertent detonation, frangible internally threaded nuts are chosen in lieu of pyrotechnically actuated nuts. This approach, too, is well established. Pyrotechnic nut cutters and chisels are available, as well as nuts readily separated by shearing forces, and nuts fabricated with frangible sectors. Use of such devices is well established. It is to be stressed at this point that due to the high-energy shock, not only nut casing 8, but plunger chamber 10 must be rigidly attached to a structure. Thus nut casing 8 and cylindrical plunger chamber 10 are screwed on to a threaded pipe-like stud formed in their abutting structures.

As can be imagined the crux of the releasable locking assembly of this invention exists in the components illustrated within cylindrical plunger chamber 10. As can be discerned from FIG. 2 the cylindrical plunger chamber 10 is a hollow cylindrical that houses those components. Fitting slidably along the inside surface of cylindrical plunger chamber 10 is a coil spring 16. By fitting slidably we mean that the distance from the axis to the exterior surface of coil spring 16 is approximately equal to the distance from the axis to the interior surface of cylindrical plunger chamber 10. On compression or retraction, then, spring 16 glides along the interior cylindrical wall of cylindrical plunger chamber 10.

A plunger 18 resides within coil spring 16. the plunger is provided with oppositely disposed slots or air exhaust ports 12, only one of which is visible in the figure. The size of the plunger is that described for the spring within the cylindrical plunger chamber. In other words the distance from the axis to the outer surface of plunger 18 is approximately equal to the distance from the axis to the inside coil spring (16) surfaces. Plunger 18, then, is slidably disposed within coil spring 16. In addition to being slidable within coil spring 16, plunger 18 must, as a plunger, compress spring 16 to provide the recoiling or spring retraction force required to withdraw the joining bolt (15). For this purpose the end of plunger 18 away from interface plane 7 is provided with a flange or rim 19. Flange 19 abuts coil spring 16 which surrounds plunger 18. When plunger 18 is forced toward interface plane 7 by a special tool, spring 16 is compressed. The bolt extracting mechanism 2 is shown in this compressed state in FIG. 2. It now remains to examine how the plunger retracts the joining bolt 15. For this examination plunger bolt 20 comes into play.

Figure 3:
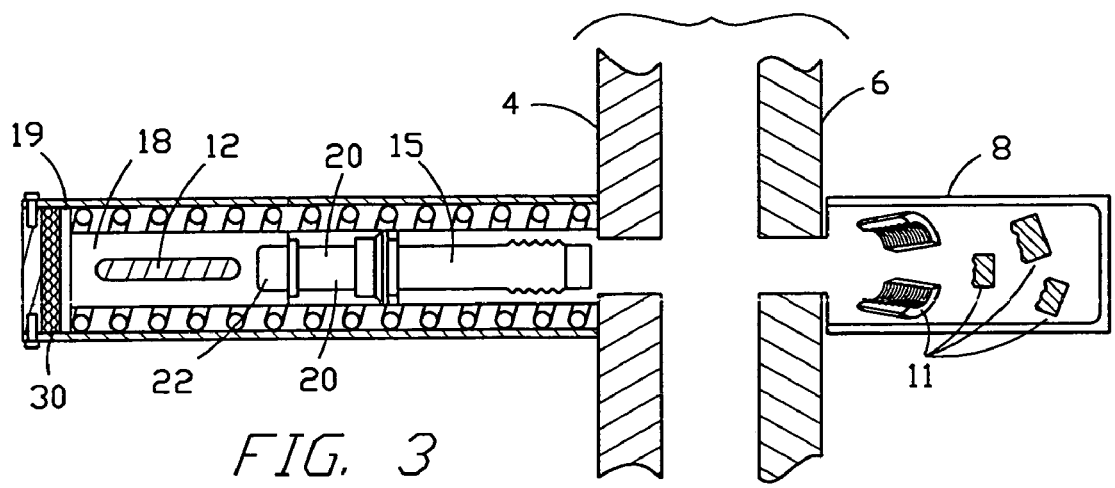
FIG. 3 is a longitudinal cross sectional view showing the bolt retractor mechanism after the joining bolt has been extracted.
Figure 4:
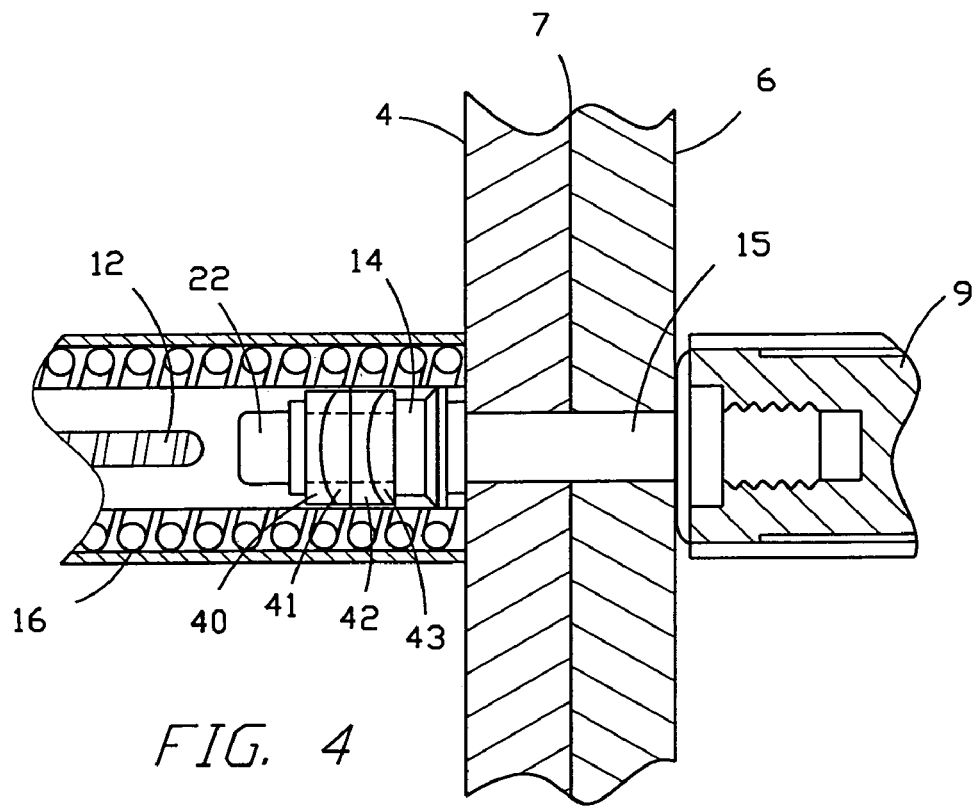
FIG. 4 is a view similar to FIG. 1, partially cutaway and enlarged to illustrate another embodiment of the invention.

On one end plunger bolt 20 is in the form of a rod with a bolt head 22 resembling a conventional bolt head. The end of the plunger bolt opposite bolt head 22 is provided with standard bolt threads. By known means to be considered hereinafter, plunger 18 is adapted to retain plunger bolt 20 within plunger 18 so that the threaded end of plunger bolt 20 is adjacent to bolt head 14 of the joining bolt 15. Bolt head 14 in turn is machined to form a recess or hole having internal threads mating with those on the threaded end of plunger bolt 20. When the special tool forces plunger 18 toward interface plane 7 compressing spring 16, the threaded end of plunger bolt 20 is inserted and tightened in the threaded hole in bolt head 14 of joining bolt 15. The plunger bolt 20 will be coupled to plunger 18 by any known means. For many uses the connection of plunger bolt 20 to joining bolt 15 will be as shown in FIGS. 2 and 3. However in our preferred embodiment, unique in this field, the plunger bolt and the joining bolt will be modified as seen in FIG. 4. Thus, between the head of plunger bolt 20 and the bolt head 14 of the joining bolt 15 a system of spherical washers 40, 41, 42, and 43 are installed. These washers are designed to allow limited rotation of the joining bolt about any axis. This rotation adeptness insures rapid retraction by minimizing impingement of the joining bolt on surrounding components. In addition, in order to minimize friction between the washers, each washer is coated with a solid lubricant.

For a more complete understanding of the operation of the bolt retractor mechanism 2 of this invention we refer to FIG. 3. Retraction begins with the separation of frangible nut 9 into its pieces 11. This is accomplished by activation by any pneumatic, hydraulic or pyrotechnic device capable of splitting or dislodging frangible nuts. When frangible nut 9 breaks, spring 16 instantly acts against flange 19 integral with plunger 18 to drive plunger 18 away from interface plane 7. As described plunger 18 is coupled to plunger bolt 20. Now, since plunger bolt 20 is screwed into joining bolt 15, the joining bolt is instantly retracted. Moreover the cylindrical plunger chamber prevents the joining bolt from snagging on the spring.

Based on the foregoing description it can be seen that bolt retractor mechanism 2 will lend itself to usage in various applications. However, it is recognized that energy is potentially a source of mechanical shock. It has been indicated previously that pyrotechnics are to be avoided in our preferred embodiment. Of course, since the spring provides the retracting force allowing pyrotechnics only for splitting the frangible nut such approach is acceptable. However, in our preferred embodiment for use in the X-38 project it is desired to minimize the mechanical shock emanating from the abrupt impact of the plunger at the end of retraction. To this end various suggestions have been made for the reduction of release shock. These include pressurized housings, passive damping by the use of cushions, and active damping by the use of deformable members. These approaches are qualitative in nature and hence must be instituted by trial and error based upon the force of the impact received. Herein it has been found that if honeycomb is used the force of the impact can be derived from the density of the core material and its thickness along with its crush strength. For this reason honeycomb is desired herein for shock release, and it is illustrated as 30 in FIG. 2. In FIG. 3 honeycomb 30 is illustrated in its compressed state.

The most important design parameters for a releasable locking device for holding the X-38 lifting body and the deorbit propulsion stage together were found to be a very fast bolt retraction time, say, in the 20 to 40 millisecond range, with no interference during separation, and no interference during mating process of the lifting body and the deorbit propulsion stage. To demonstrate that the releasable locking device of this invention satisfies those parameters the following procedures are given.

DEMONSTRATION PROCEDURES

EXAMPLE 1

Procedure

A pyrotechnic shock facility was used to perform pyrotechnic tests, shock tests, and pyrotechnic shock tests of both pyrotechnic and nonpyrotechnic systems and components of the invention. The bolt retractor system hardware and test fixtures were bolted to a reaction mass in a test chamber with the forward interference truss and lifting body longeron held in place by test fixtures.

Results

The test fixtures did not simulate the X-38 vehicle/deorbit propulsion stage separation event, but the functional demonstration showed that the bolt retractor system functioned properly without damaging its components and causing a safety hazard. The demonstration also provided a good estimate of bolt separation timing.

EXAMPLE 2

Procedure

The X-38 vehicle/deorbit propulsion stage separation event was demonstrated on a Large Mobility Base. It is a large air-bearing simulator which is allowed to float across an epoxy resin floor by three air bearings. It thus acts as an air sled flowing, across the air-bearing floor propelled by air jet thrusters. The function of the large mobility base is to provide a free-floating vehicle and interface for bolt retractor retraction algorithm testing. It is adapted to run either a Windows or Linux operating system. The bolt retractor system of the invention was mounted on the large mobility base. The large mobility base was maneuvered onto a stand and the retractor system bolt was torqued to the required specifications. The nut separation pyrotechnics were fired and the vehicle movement was measured. Two accelerometers and a gyroscope were mounted in the center of mass to sense both the X and Y acceleration compoonents along with yaw rate. Three laser rangefinders were mounted to provide X and Y locations along with the yaw of the vehicle.

Results

The accelerometer data were run through a digital Butterworth filter in order to separate the rigid body acceleration from the pyrotechnic shock and airflow vibration. Using this low-pass filter with a 0.25 Hz cutoff, the peak solid body acceleration seen was 0.015 Gs. Differentiating the position data yielded an acceleration of approximately 0.1 m/s$^2$. Peak velocity derived from position data was 0.02 m/s.

EXAMPLE 3

Procedure

Proper recording of the precise moment the bolt separation device activated was needed for subsequent data analysis. Since the data acquisition system was on the Large Mobility Base and the pyrotechnic device was stationary, a method was needed for the firing signal to cross the interface without impacting the large mobility base ability to free-float.

Results

The solution was to use a light emitting diode and phototransistor. The large mobility base mount contained the phototransistor while the light emitting diode was in the base. The light emitting diode was contained in a two-piece mounting bracket created by connecting two base mounts. Alignment pins were used to establish a positive alignment.

EXAMPLE 4

Procedure

Two high-speed film cameras recorded the separation events in the demonstrations with a rate of 400 frames per second (fps). The first camera recorded the plunger/joining bolt retraction as viewed through the slots in the cylinder of the Bolt Retractor System (BRS). A painted white stripe on the plunger gave contrast between components. The second camera recorded the movement of the separation nut.

Results

The data from the first camera showed that the retraction time from separation to interface crossing was identical (approximately 20 ms) in two different runs. The second camera recorded little movement in the separation nut upon separation.

EXAMPLE 5

Procedure and Results

Using a high-speed digital camera the separation event was also recorded in two separate runs. This camera also showed that the retraction time was approximately 20 ms.

EXAMPLE 6

Procedure

To further verify the bolt retraction time, a timing system was designed and built to measure the timing of the plunger in the bolt retractor system without physical contact. The system uses four infrared light emitting diode light sources and sensors mounted in an aluminum frame. The timing system is mounted under the bolt retractor system cylinder so that the light emitting diode light passes through two slots in the cylinder and in front of the plunger.

Results

The timing system resulted in the same approximate 20 ms separation time that the camera results showed.

The foregoing examples demonstrate that the bolt retractor system of this invention is eminently suitable for use as part of the X-38 separation system. The design goal of a bolt retraction time of 40 milliseconds was exceeded by a factor of two (average of 20 msec.) in all the examples. The examples thus provide a good estimate of the bolt separation timing, and the bolt retractor mechanism was able to fully function by releasing the separation nut for full-joining bolt retraction. In addition, the disadvantages of pyrotechnic ejector mechanisms have been overcome by this invention. A chief disadvantage or prior systems is that their detonation imparts a physical shock resulting in vibration which can be transmitted to delicate components such as integrated circuits, circuit boards, and the like. Herein the pyrotechnic forces need only break the frangible nut because the spring supplies the force normally generated by the explosion. Moreover, the releasable locking device of this invention can be manufactured at a much lower cost than others meeting the criteria set forth herein.

It is to be understood that the rate of retraction of the bolt herein is a function of the properties of the spring (the spring constant). The bolt retractor spring was designed to retract the joining bolt across the interface plane between the X-38 lifting body and a deorbit propulsion stage in a time of 0.020 seconds after activation of the pyrotechnic release nut. The spring, with a nominal diameter of 3.355-inch, was designed at the Marshall Space Flight Center. Neglecting friction, the idealized equation for a spring-mass system such as that used in the BRS is:

$$m\frac{d^2 x}{dt^2} + kx = 0 \tag{1}$$

where m is the mass of the bolt, plunger, and washer assembly, k is the spring stiffness, and x is the displacement of the bolt/plunger/washer assembly from the spring's free length. The solution of this differential equation is well known and is:

$$x = x_0 \cos \omega t \tag{2}$$

$$\omega = \sqrt{\frac{k}{m}} \tag{3}$$

where t is the time, ω is the natural frequency. Since x is defined from the free length position of the spring and the spring is initially compressed before bolt retractor activation, the initial displacement is $x_0$. In the BRS that was demonstrated, $x_0$ was 5 inches.

The distance that the plunger/washers/bolt assembly needed to travel to clear the interface plane was 4.189 inches. This means that $$x_{ic} = x_0 - 4.189 = 0.811 \text{ inches} \tag{4}$$

where $x_{ic}$ is the displacement of the spring from its free length at the point of interface crossing. The time of interface crossing, $\tau_{ic}$, is calculated by substituting $x_{ic}$ for x in equation (2):

$$x_{ic} = x_0 \cos \omega \tau_{ic} \tag{5}$$

The equation for calculating $\tau_{ic}$ thus becomes:

$$\tau_{ic} = \frac{1}{\omega}\cos^{-1}\left(\frac{x_{ic}}{x_0}\right) \tag{6}$$

The BRS spring had the following values:

k=85.05 lbf/in m=5.152 lbf/386.4 in/s²

Substituting these values into equations (3) and (6), the time to cross the interface becomes:

$\tau_{ic}$=0.018 sec

In the light of the teachings herein variations and ramifications will occur to those skilled in the art. As an example, under certain circumstances it may be necessary to join more than two structures together. As another example it has already been stressed that some aspects of the invention, such as detonation, the type of nut, and the means of attaching the mechanism to the structures to be joined are within the skill of the art. As still another example, it has been indicated that the attachment of the plunger bolt 20 to the plunger 18 is a matter of engineering. In lieu of the end plate the plunger bolt can be passed through a slotted hole in the base of the plunger. Washers can then be inserted through the slot to retain the bolt head with or without a keeper or speed nut. A larger port can be provided in the flanged end of the plunger to access the plunger bolt in order to attach it to the joining bolt. Further, although the mechanism herein was developed with the X-38 project in mind, it is apparent that further applications and adaptations of the mechanism are possible given the teachings herein. These and other modifications within the skill of the art are deemed to be within the scope of this invention.

What is claimed is:

1. A releasable locking assembly adapted for use in rapidly retracting a joining bolt joining two structures together said joining bolt passing through adjacent bolt holes in the two structures with a bolt head against one of the structures and a threaded bolt end protruding from the other structure to be secured by a frangible nut on that side of an interface plane between the two structures, the releasable locking assembly including a bolt retractor mechanism comprising a plunger chamber in the form of a hollow cylinder with a closed end and an open end; a spring in the form of a coil; a plunger in the form of a piston; a plunger bolt having a bolt-head end and an opposite connecting end; and a joining bolt; the coil spring being adapted to fit slidably within the cylindrical plunger chamber; the plunger being adapted to fit slidably within the coil spring; the plunger having a flanged end and an opposite insertion end; coupling means for attaching the insertion end of the plunger to the head end of the plunger bolt, the flanged end of the plunger being adapted to abut and compress the coil spring when the plunger is forced toward the interface plane, and to retract the plunger bolt by forces exerted by the expanding spring; and means coupling the connecting end of the plunger bolt to the joining bolt so that the joining bolt is retracted by the plunger.

2. The locking assembly of claim 1 wherein the two structures are portions of spacecrafts, and wherein the open end of the cylindrical plunger chamber is adapted to be joined in abutment to one of the structures by a fitting that surrounds the head of the joining bolt in that structure; and wherein the frangible nut is encased in a housing adapted to be secured to a fitting on the other structure.

3. The locking assembly of claim 1 wherein the plunger bolt is coupled to the plunger by passing through an end plate in the plunger, and wherein spherical washers are inserted on each side of the end plate to minimize impingement of the joining bolt on surrounding components.

4. The locking assembly of claim 3 wherein the spacecrafts are a deployable assembly and a support structure, wherein the plunger bolt is provided with external threads, wherein the head of the joining bolt is provided with a recess having matching internal threads, and wherein the plunger bolt and the joining bolt are screwed together.

* * * * *